United States Patent [19]

Palmer

[11] 4,402,584
[45] Sep. 6, 1983

[54] DUAL SLIDE PROJECTOR AND TRAY

[76] Inventor: Morrie Palmer, 7626-12th Ave. South, Richfield, Minn. 55427

[21] Appl. No.: 351,034

[22] Filed: Feb. 22, 1982

[51] Int. Cl.³ .............................................. G03B 23/06
[52] U.S. Cl. .................................... 353/117; 206/456
[58] Field of Search ................. 353/117, 107, 103, 83, 353/86, 90, 93, 94, 111; 206/456, 455, 303; 40/503, 366, 367; 211/129, 131, 56; 308/182; 312/125, 135, 186

[56] References Cited

U.S. PATENT DOCUMENTS

| 632,649 | 9/1899 | Goldborg | 40/503 X |
|---|---|---|---|
| 662,483 | 11/1900 | Young | 40/503 |
| 925,398 | 6/1909 | Toombs, Jr. | 308/182 |
| 1,349,640 | 8/1920 | Trueblood | 353/107 |
| 3,126,864 | 3/1964 | McIntosh | 211/129 X |
| 3,225,652 | 12/1965 | Sauppe | 353/117 |
| 3,276,314 | 10/1966 | Robinson | 88/27 |
| 3,411,845 | 11/1968 | Pester et al. | 353/88 |
| 3,499,708 | 3/1970 | Hall | 353/107 |
| 3,609,025 | 9/1971 | Hall | 353/107 |
| 3,644,031 | 2/1972 | Bennett | 353/117 |
| 3,718,392 | 2/1973 | Harvey | 353/111 |
| 4,232,953 | 11/1980 | Alvarez-Sabater | 353/11 |
| 4,253,789 | 3/1981 | Hultgren | 414/405 |
| 4,291,955 | 9/1981 | Alvarez-Sabater | 353/11 |

OTHER PUBLICATIONS

Magazine Article, (source unknown), Title: "Still Projectors", publishing date unknown, probably 1981.
Catalogue sheet, (source unknown), Title: "Slide Projectors", p. 157, date unknown.

Primary Examiner—Stephen Marcus
Assistant Examiner—William R. Sharp
Attorney, Agent, or Firm—Merchant, Gould, Smith, Edell, Welter & Schmidt

[57] ABSTRACT

A dual slide tray projection system is disclosed. The projector (12) has two independently operating projection mechanisms including gates (24, 26) advancing mechanisms (28, 30, 32, 34) and lens assemblies (202, 204). The slide tray (60) includes an inner (62) an outer (64) ring. The rings are independently advanceable and selectable and are only locked together by locking mechanism (140) when the tray is removed from the projector at the 0 index position.

8 Claims, 7 Drawing Figures

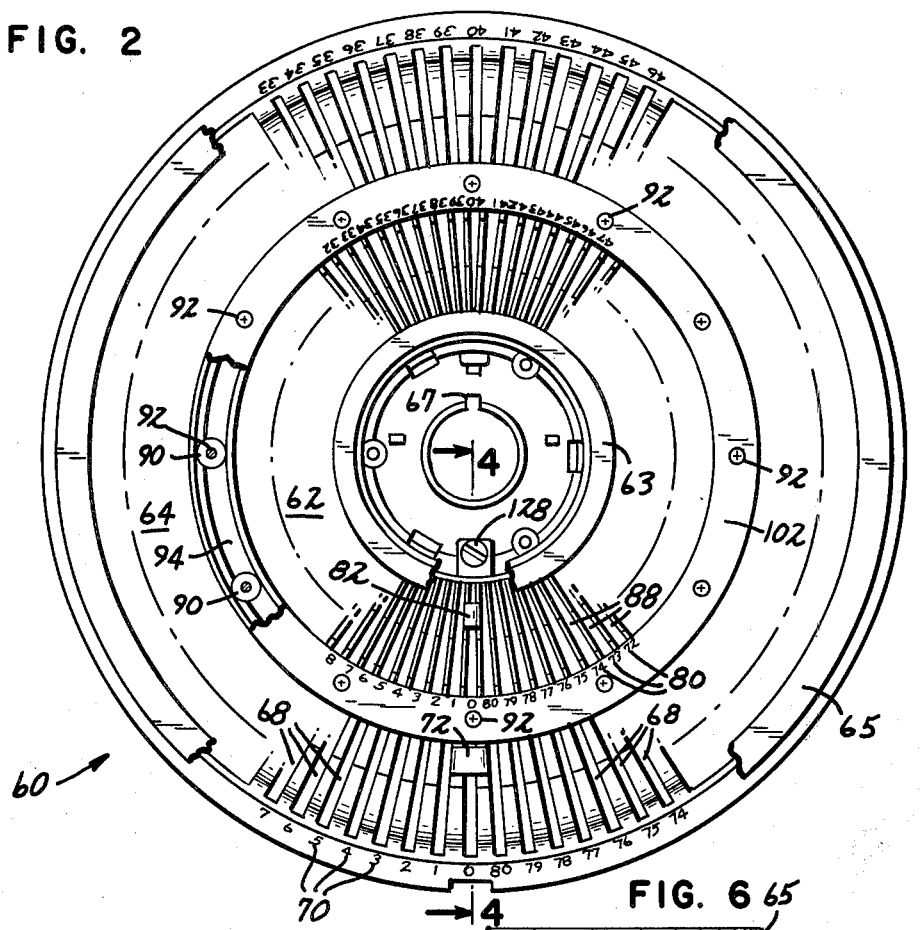
FIG. 2
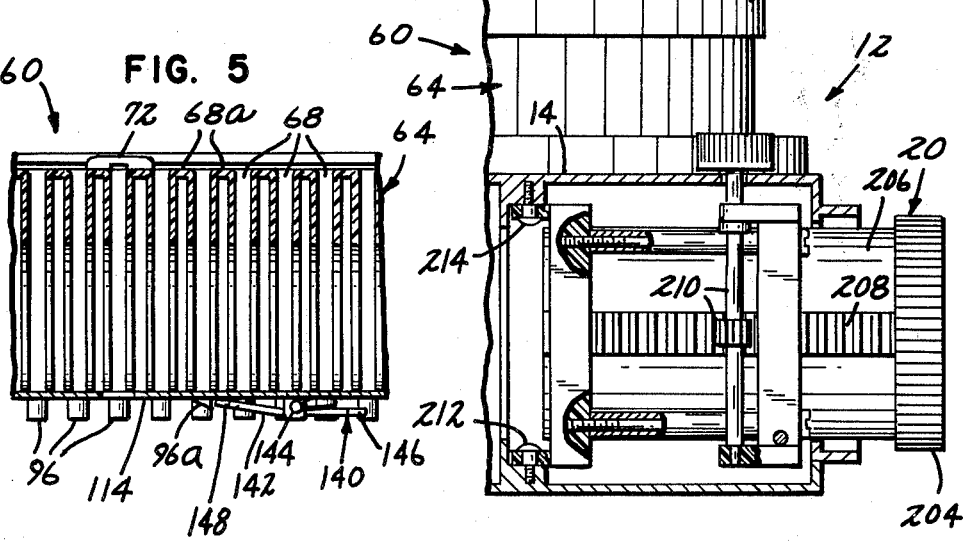
FIG. 5
FIG. 6

DUAL SLIDE PROJECTOR AND TRAY

TECHNICAL FIELD

This invention relates generally to slide projectors and trays therefore, more specifically, to an improvement which permits a single slide tray having two concentric ringed compartments to project in independent sequence, slides from each tray simultaneously or alternately.

BACKGROUND OF THE INVENTION

Slide projectors and trays, particularly those using circular trays, are well known in the art. (See, for example, U.S. Pat. No. 3,499,708 and U.S. Pat. No. 3,411,845). In particular, the series of projectors made by Kodak (TM) in their Carousel (TM) line use a gravity feed system having a horizontally disposed circular tray to project slides (see U.S. Pat. No. 3,276,314).

In many applications, however, it is important to align two projectors to cover the same image area so that a programmable lap dissolve may be used to fade from one slide to the next, or simulate motion by simple animation or rapid slide change. These functions must necessarily be performed by two projectors or otherwise a projector with two projection means and separately addressable slide trays. One such system is that shown in U.S. Pat. No. 3,718,392 which employs two straight-line slide trays interlocked into a side-by-side relationship. This limits the unit to sequential slide access to slides immediately preceding and following the projected slide. Unfortunately, straight-line slide trays have not been convenient for projecting a large series of slides as the length necessary for the tray becomes prohibitive. Furthermore, if the dissolve programming indicates the need to superimpose an image over three or four other images, the effect has to be simulated by the use of additional slides which would use up more of the limited tray space. In addition, if the slides are projected out of sequence involving random access, a straight-line slide tray will have inordinately long access time where the slides have addresses which would be at opposite ends of the tray.

In the present invention, functions which could be performed by two separate slide projectors are combined into a single unitary machine using a unique circular tray which can independently and randomly access any slide in either of its concentric slide holding rings. Combining this single unit projection system with a programmable lap dissolve creates an effective tool for communication which is as easy to use as a single projector. Set up time and reliability are enhanced while the size of the machine and slide trays are capable of being produced in a convenient size such that they may be easily transported.

BRIEF SUMMARY OF THE INVENTION

The present invention is directed to a slide projecting system including a projector and a slide tray with first and second concentric slide holding rings. Bearing means are disposed between said first and second rings to allow for relative rotation of the rings. Means are also provided in each ring for containing slides therewithin and accessing one slide in each ring at a time.

According to another aspect of the invention, there is disclosed means for correcting for parallax between a pair of lenses.

According to another aspect of the invention, there is disclosed a dual slide projection tray in accordance with the above.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and the accompanying descriptive matter in which there are illustrated and described a preferred embodiment of the invention.

BRIEF DESCRIPTION OF THE DRAWINGS

FIG. 2 is a top plan view of a preferred embodiment of the slide tray in the present invention;

FIG. 5 is a view taken along lines 5—5 of FIG. 3;

FIG. 6 is a view taken along lines 6—6 of FIG. 1; and

DETAILED DESCRIPTION OF THE INVENTION

The preferred embodiment of the present invention employs a projection system based upon that found in the widely sold Kodak Carousel (TM) projector series such as models 650, 750, 800, 4000, 5600, and the like. Further detail of these machines is shown in U.S. Pat. No. 3,276,314 issued to Robinson. All of the above are hereby incorporated by reference.

To avoid an inordinately long description, the detailed description herein will cover only those features which either would not be apparent to a person skilled in the art or which are already disclosed in any of the above references. Furthermore, it is understood that although the preferred embodiment is based on the Carousel (TM) concept, that other projection systems currently known could be adapted to employ the present invention drawing only upon skills of an ordinary person in the art to achieve this transition.

Figure 1:
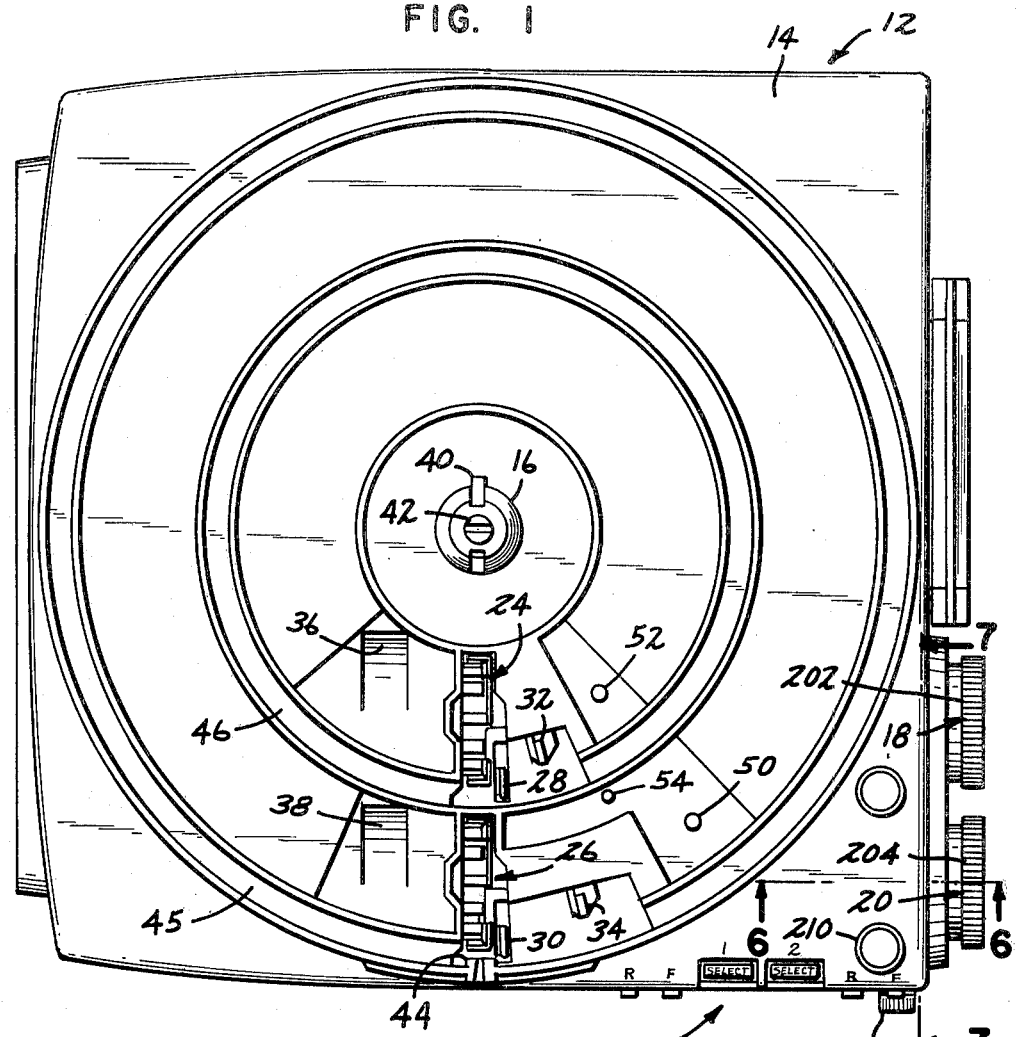
FIG. 1 is a top plan view of a preferred embodiment of the projector of the present invention.

Now referring to the drawings in detail, wherein like numerals represent like parts, there is shown in FIG. 1, a top plan view of the dual projector 12 having a top surface 14, a center spindle 16, a pair of lenses 18 and 20, and a plurality of controls 22.

On top surface 14, there can be seen gates 24 and 26 in the preferred side-by-side radially in-line arrangement. Adjacent each of the gates is an engagement arm 28 and 30 and the advancing arm (used for advancing and reversing) 32 and 34. On the other side of gates 24 and 26 are apertures 36 and 38 which are used to supply warm air to the slide tray to provide focusing stability. The operation of parts 24-38 is described in U.S. Pat. No. 3,276,314 and is used in all Carousel (TM) projectors. The operation of the gating and advancing means will therefore not be described in further detail except to say that the present invention employs the same gating system in a side-by-side relationship.

Spindle 16 is the same as that used in the above cited references and has a tab portion 40 which extends beyond the periphery of the spindle. The tab can be retracted by turning screw 42. The retraction permits removal of the slide tray (other than at notch 67) in the event it becomes jammed in a position other than the 0 (zero) index, as will be explained hereinafter.

Adjacent gate 26 toward the outer periphery of surface 14 there is located a flange 44 which extends into a depressed circular region 45. A similar depressed circular region 46 is located concentric with region 45. These regions provide space for indexing pins found on the tray, as will be explained hereinafter. Flange 44 provides a keyway which permits insertion and removal of the tray only when the keyway on the tray is aligned with the flange (at the 0 index position).

The top surface 14 preferably includes three pins or members projecting outwardly therefrom. The first pin 50 is used to engage the outer ring of the tray as will be explained hereinafter. The second pin 52 is used to engage the inner ring of the tray, and the third pin 54 is used to release a locking mechanism on the tray which locks the inner and outer rings together as will be explained hereinafter.

Figure 3:
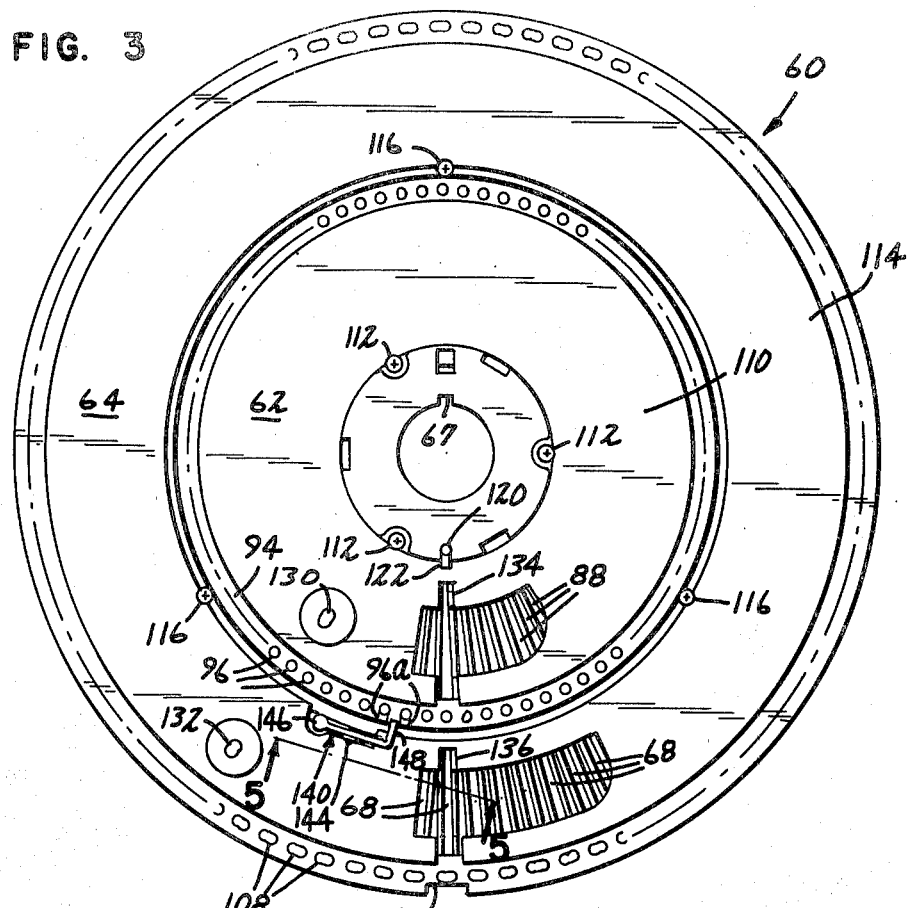
FIG. 3 is a bottom plan view of the subject matter in FIG. 2.

Turning to the slide tray 60 itself, there is shown in FIG. 2 a top view and in FIG. 3 a bottom view thereof. In brief, the slide tray resembles that commonly employed on the Kodak Carousel (TM) projectors disclosed in the references cited above. To the extent that the tray 60 is identical with the prior art, such matters will not be discussed in detail.

Tray 60, however, departs substantially from the prior art in that it is a dual ring slide tray and designed to perform the functions thereof. As seen in FIG. 2, tray 60 includes a first inner ring 62 and a second outer ring 64 concentric therewith. The inner diameter of ring 64 is greater than the outer diameter of ring 62. At the outer edge of ring 64 is a keyway 66 which mates with flange 44 on the projector.

Ring 64 includes a plurality of slots or compartments 68 which are used to hold slides in a vertically spaced orientation. Each of the slots has an indexing number 70 associated therewith and located at its outer periphery. Slot 0 is prevented from receiving slides by a bridge 72.

The inner ring 62 similarly is calibrated with index numbers 80 which correspond to slide compartments 88. Slot 0 is prevented from receiving slides by bridge 82. It is noted that in the preferred embodiment, an equal number of slide compartments are found in both rings 62 and 64. This was accomplished by spacing the compartments in ring 64 wider apart so that they will be in substantial alignment with the inner ring. This is done for convenience; however, it is possible to have a larger number of slides in the outer ring. Slides are prevented from falling out of compartments 68 and 88 from the top surface by a friction ring 63, 65. Ring 63 is well known in the art and used in the prior art Carousel (TM) slide trays. Ring 65 is similar therto except that it engages the outer periphery of ring 64 rather than the inner periphery. Ring 65 includes similar serrated portions to frictionally engage the wedge portion 69 on the outer periphery.

Figure 4:
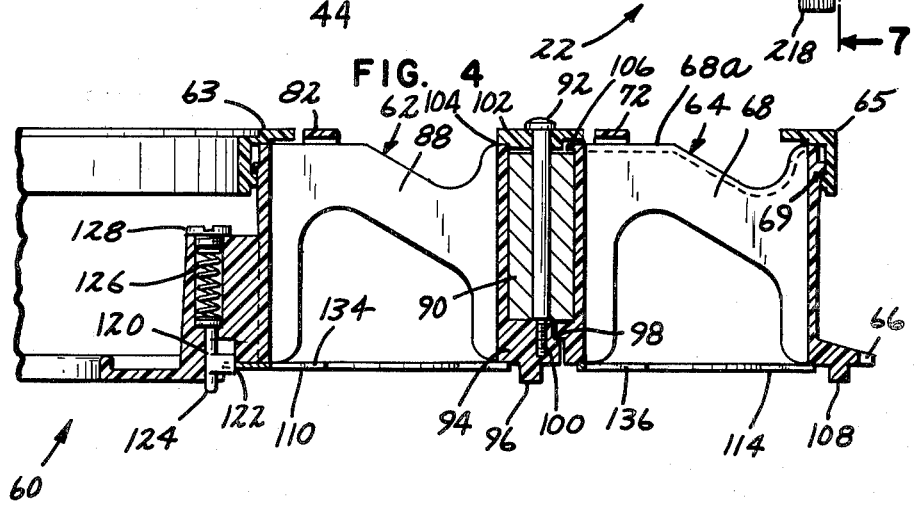
FIG. 4 is a view taken along lines 4—4 of FIG. 2.

The interconnection between rings 62 and 64 can best be seen in FIG. 4. Between compartments 88 and 68 there is a region which includes a plurality of bearing members 90 (which can also be seen in FIG. 2). These bearings are preferably cylindrical in shape and have an aperture along their longitudinal axis for the insertion of spindle 92. At the outer periphery of ring 62, there extends a flange 94 from which indexing teeth 96 protrude downwardly. Flange 94 also inclues a shelf 98 and apertures 100 for receiving spindle 92 of bearings 90.

At the top ends of the tray, there is a bridge member 102 which is annular in shape as can best be seen in FIG. 2. Bridge member 102 includes a notch 104 which engages the outer periphery, upper edge of ring 62. Bridge 102 also includes a notch 106 which engages the inner peripheral edge of ring 64.

When assembled, it can be seen that by means of notches 104 and 106, and shelf 98, rings 62 and 64 are held coplanar such that neither ring can move vertically with respect to the other. On the other hand, however, bearings 90 permit the relative rotation between the two rings to occur. This allows for different slides to be selected in each of the rings independently of the other.

Corresponding to teeth 96 in ring 62 are teeth 108 in ring 64. These teeth engage the drive mechanism of the projector in a way as known in the prior art in the Carousel (TM) system.

Turning to the underside of the tray, which can be seen in FIG. 3, inner ring 62 includes an indexing plate 110 which is maintained thereon by screws 112 which allow the plate to rotate but maintain it in substantial contact with the ring.

As seen in FIG. 3, teeth 108 are preferably wider than teeth 96 in order to accommodate the greater angle of rotation required to advance to the next slide position in the outer ring.

Similarly, ring 64 includes a bottom index plate 114 corresponding to plate 110 on the inner ring and being held by corresponding screws 116.

Plate 110 is maintained in its "0" index position (i.e., the starting position for the slide tray) by the engagement of lever 120 in an indentation 122 in plate 110. FIG. 4 more clearly shows this locking engagement. Lever 120 has a portion 124 extending outwardly from the bottom surface of the slide tray 60. Lever 120 is biased downward by spring 126 which is maintained by cap 128. When slide tray 60 is placed upon the projector base 12, portion 124 contacts top surface 14, just outwardly of spindle 16 (see FIG. 1) and causes lever 120 to be biased upwardly. This causes disengagement of member 120 with indentation 122.

As an alternate means for locking the inner slide tray, the structure known in the above cited art with respect to Carousel (TM) slide trays are also satisfactory.

Turning back to FIG. 3, there can be seen on each plate 110 and 114 an indexing aperture 130 and 132, respectively. These apertures engage pins 52 and 50, respectively, as found on the top surface of the projector (see FIG. 1). The purpose of the indexing aperture is to maintain bottom index plates 110 and 114 in a fixed position while the tray rotates. This will cause a different slide compartment to become accessible through slots 134 and 136 in the plates. The force of gravity will then allow the slide to drop into the gate of the projector.

To prevent rings 62 and 64 from rotating with respect to each other when the tray is removed from the projector, locking mechanism 140 is provided. This mechanism which is preferably affixed to plate 114 includes a lever 142 on a pivot 144. The lever has a first end 146 and a second end 148 which extends orthogonally from the main body of the lever toward the inner ring 62. The lever has a spring bias which causes end 148 to be biased upwardly against the bottom of tray 60. At position 0, teeth 96 are especially formed as shown with extenders 96A which insure engagement of end 148 of lever 142 with these particular teeth. This insures that the two trays will be in rotational synchronization at their 0 index position when the tray is removed from the projector. When the tray is installed on the projector, end 146 of lever 142 engages projection 54 on the projector (see FIG. 1) thereby disengaging the locking mechanism entirely. Reference can be had to FIG. 5 which shows the mechanism in a different view. Also in FIG. 5, there can be seen the individual slide compartments 68 in outer ring 64. Unlike the inner ring, the slide compartments are bounded by double walled, bridged elements 68A which compensate for the increased space between slide compartments resulting from the greater radius of the outer ring.

Figure 7:
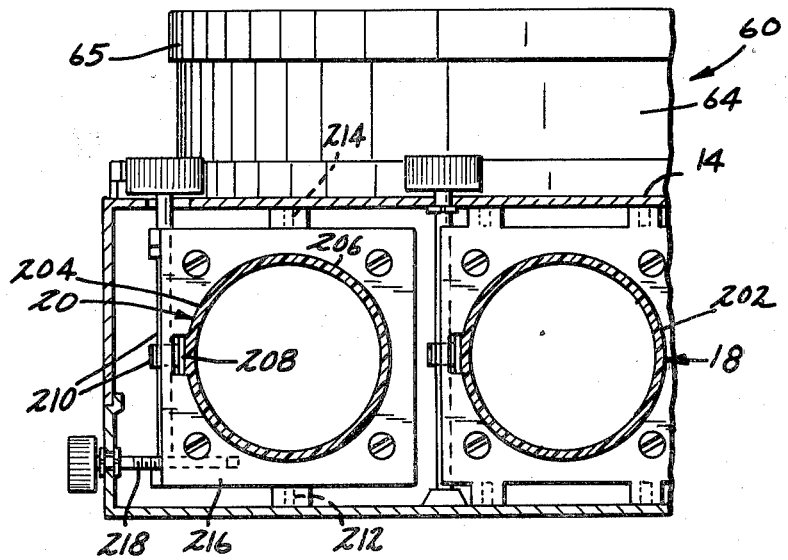
FIG. 7 is a view taken along lines 7—7 of FIG. 1.

Turning back to the projector itself, it is understood that problems of parallax would normally arise where two lenses spaced apart must focus on the same target point at various distances from the screen. If the images do not strike the target in exact alignment, simultaneous projection and rapid sequencing of similar slides will appear out of register. To compensate for this problem, it is necessary to have one of the lenses adjustable in a horizontal direction. FIGS. 6 and 7 disclose the preferred structure to accomplish this purpose.

In FIG. 7, there can be seen two lens assemblies 202 and 204. Assembly 202 is of the type known in the prior art such as used in Carousel (TM) projectors. The lens itself is mounted within a frame structure which itself is affixed to the projector. The frame structure includes apparatus for focusing which moves the lens in and out. The same arrangement is used in lens assembly 204 subject to the following changes.

Lens assembly 204 includes a lens tube with optics 206 having a rack gear 208 which engages a pinion gear and shaft 210 as known in the prior art. To cause horizontal movement, lens assembly 204 is mounted at its rear with two pivot pins 212 an 214 which are generally centered across the width of the lens assembly. At its front end, assembly 204 includes a threaded portion 216 which receives a threaded shaft 218. Shaft 218, affixed to the housing of the projector, is thereby immobilized except for its rotational movement. Assembly 204 is free to move on pivot pins 212 and 214. Thus, by rotation of threaded shaft 218, movement is imparted to the front portion of lens assembly 204 causing the front end of the assembly to move in the horizontal right or left direction on pivots 212 and 214. In operation, once the distance to the screen has been set, the user can project two identical slides to adjust for proper alignment.

OPERATION OF THE INVENTION

Preliminary consideration to operating the projector system is the loading of slides into slide tray 60. To accomplish this, the top locking rings 63 and 65 (shown most clearly in FIG. 4) must be removed. This is accomplished by turning the locking ring so that its teeth disengage like teeth on the slide tray. The inner ring is substantially identical to that used in the prior art and the outer ring is simply a mirror image thereof. Slides may then be inserted into the slide compartments 68 and 88 with the exception of compartment 0 which is the starting position for the tray.

The tray is then placed upon the projector such that keyway 66 of the tray is in alignment with flange 44 of the projector top surface. Likewise, notch 67 located toward the center of the tray will be aligned so that member 40 on the projector spindle 16 will pass therethrough.

Once placed on the projector, the indexing apertures 130 and 132 in index plates 110 and 114 will engage pins 50 and 52 on the projector, thereby locking index plates against rotational movement. Lever 120, toward the center of the tray, will be biased upwards raising indentation 122 thereby releasing the effective mechanical brake between plate 110 and the inner ring 62. Likewise, locking mechanism 140 will be disengaged as has been explained earlier, so that inner ring 62 and outer ring 64 may rotate independently.

In the manual mode, the operator may then select any location on either ring by depressing "select 1" or "select 2" controls 22 in a manner well known in the prior art devices. This will allow either tray to be rotated to a desired position for start. From then, controls 22 marked R and F can be used for forward and reverse movement of either tray independently or simultaneously.

Computer control can be added to these controls to preprogram any sequence of slides in either ring. Thus, it is possible to project slides completely out of their original sequence, if desired.

It is desirable to insert a duplicate slide as the first slide to be shown in order to orient lens assembly 206 to lens assembly 202. This can be done as explained above. When the projector is placed in the fan mode and a lap dissolve unit is plugged into the projector outlets, it will respond as two conventional projectors would respond to the same dissolve unit's program comments.

The tray cannot normally be removed except in its 0 index position. If, however, a jam occurs, the tray can be released from the center spindle by rotating screw 42 which retracts element 40. This method is known in the prior art.

It is understood that the inventive concept can be practiced upon projectors having horizontally disposed trays as shown, as well as vertically disposed trays as used in some prior art systems.

Numerous characteristics and advantages of the invention have been set forth in the foregoing description together with details of the structure and function of the invention. The novel features thereof are pointed out in the appended claims. The disclosure, however, is illustrative only and changes may be made in detail, especially in matters of shape, size, arrangement of parts, within the principle of the invention, to the full extent of the broad general meaning of the terms in which the appended claims are expressed.

I claim:
1. A slide tray comprising:
    (a) a first circular slide holding ring having predetermined inner and outer diameters;
    (b) a second circular slide holding ring having an inner diameter greater than said outer diameter of said first ring, said first and second rings being coplanar;
    (c) bearing means for allowing relative rotation between said first and second rings disposed between said outer diameter of said first ring and inner diameter of said second ring; and
    (d) advancement mechanism affixed to each of said rings for independently and incrementally rotating each of said rings so that different slides may be viewed.

2. A slide tray for use with a slide projector comprising:
    a first slide holding ring having a top and bottom and a plurality of slide holding compartments therebetween, a second slide holding ring concentric with and encompassing said first ring, said second ring having a top and bottom and a plurality of slide holding compartments therebetween, bearing means in contact with the outer periphery of said first ring and the inner periphery of said second ring for permitting relative rotation between said first and second rings, means slidably affixed to the bottom of each of said rings for permitting access to a single slide in one of said slide holding compartments, advancement means affixed to each of said rings for independently incrementally rotating each of said ring so that different slides may be viewed, locking means affixed to said second ring for releasably engaging said advancement means of said first ring so that said rings cannot rotate relative to each other when said locking means is engaged.

3. A slide tray according to claim 2 wherein said locking means is released when said tray is placed on the projector whereby each of said rings may be advanced at independent sequences.

4. A slide tray according to claim 3 including means affixed to each of said rings for preventing insertion and removal of the said tray from a projector unless each of said rings is positioned in a predetermined rotational position with respect to the projector.

5. A slide tray comprising:
 (a) a first circular slide holding ring having a top and bottom face, an inner and outer diameter and compartments therebetween for the insertion of a predetermined number of slides,
 (b) a second slide holding ring concentric with said first ring and having a top and bottom face, an inner and outer diameter and compartments therebetween for the insertion of a predetermined number of slides,
 (c) said first ring including a flange in its outer periphery and said second ring including a lip extending from its inner periphery and located to engage said flange to prevent downward movement of said second ring with respect to said first ring,
 (d) a plurality of bearings located between the outer diameter of said first ring and the inner diameter of said second ring at locations spaced around said rings, said bearings enabling relative rotation of said rings,
 (e) an annular bridge located adjacent the top surfaces of said rings and having an inner diameter less than the outer diameter of the first ring and having an outer diameter greater than the inner diameter of said second ring,
 (f) fastening means extending from said bridge to said flange through said bearings for preventing upward movement of said second ring relative to said first ring and for maintaining the location of said bearings,
 (g) first and second annular index plates each adjacent said bottom of said first and second rings, respectively, and slidably affixed thereto at the inner and outer peripheries of each of respective rings, each of said plates having a slot extending between said peripheries through which a slide may pass into and out of said compartments,
 (h) means affixed to said first ring for engaging said second ring to prevent relative rotational movement between said rings, said means being disengageable when the tray is placed on a slide projector.

6. A slide projection system comprising,
 (a) a dual slide tray having a top and bottom surface, including a first slide holding ring and a second slide holding ring of greater diameter than said first ring and located concentrically therearound,
 said tray including bearing means located between said rings for permitting relative rotation of said first and second means, and
 each of said rings including an indexing plate rotatably affixed to the underside of each ring, each of said plates including a slot for insertion and removal of slides and an indexing aperture controlling the relative rotation of said plate and the ring to which it is attached,
 said first ring including a predetermined number of projections extending from said bottom surface adjacent the outer periphery thereof,
 said second ring also including said predetermined number of projections extending from said bottom surface adjacent the outer periphery thereof,
 means affixed to one of said rings and engaging the projections of the other of said rings for releasably locking said rings together to prevent relative rotational movement therebetween,
 said locking means including means for releasing engagement of said rings when said tray is positioned on said projector,
 b) a slide projector having a top surface upon which said tray resides, said projector comprising,
  (1) first means for receiving, illuminating and ejecting slides and rotating said first ring and second means for receiving, illuminating and ejecting slides and for rotating said second ring;
  (2) first and second indexing pins extending from top surface, said first pin engaging said indexing aperture of said first ring and said second pin engaging said indexing aperture of said second ring.

7. A slide projector according to claim 6 wherein said first illuminating means includes means for horizontal aiming so that slides projected through said first illuminating means may be adjusted to align with slides projected through said second illuminating means at varying distances from the screen.

8. A slide projector according to claim 7 wherein said aiming means includes a lens cage for holding a lens having a front and rear end, said rear end being horizontally pivotally fixed and said front end being horizontally adjustable.

* * * * *